United States Patent
Marcial, Jr.

(10) Patent No.: US 7,908,728 B2
(45) Date of Patent: Mar. 22, 2011

(54) SYSTEM AND METHOD FOR REMOVING EXTRUSION SCREW ELEMENTS

(76) Inventor: Ismael Marcial, Jr., Lorain, OH (US)

( * ) Notice: Subject to any disclaimer, the term of this patent is extended or adjusted under 35 U.S.C. 154(b) by 1106 days.

(21) Appl. No.: 11/622,390

(22) Filed: Jan. 11, 2007

(65) Prior Publication Data
US 2007/0169328 A1   Jul. 26, 2007

Related U.S. Application Data

(60) Provisional application No. 60/760,985, filed on Jan. 23, 2006.

(51) Int. Cl.
*B23P 19/02* (2006.01)
*B23P 19/04* (2006.01)

(52) U.S. Cl. ............ 29/426.5; 29/252; 29/255; 29/261; 29/266; 29/402.03; 29/426.1

(58) Field of Classification Search ............ 29/252, 29/255, 261, 266, 280, 426.4, 426.5, 426.1, 29/402.03
See application file for complete search history.

(56) References Cited

U.S. PATENT DOCUMENTS

| | | | | |
|---|---|---|---|---|
| 2,661,063 | A * | 12/1953 | Owens | 166/301 |
| 3,061,914 | A * | 11/1962 | Johnston | 29/234 |
| RE28,251 | E * | 11/1974 | Cook | 200/61.53 |
| 4,000,554 | A * | 1/1977 | Nelson | 29/252 |
| 4,754,539 | A * | 7/1988 | Knoll et al. | 29/893.31 |
| 4,839,955 | A * | 6/1989 | Vannier | 29/402.08 |
| 4,951,387 | A * | 8/1990 | Vannier | 29/799 |
| 5,337,470 | A * | 8/1994 | Hoffman et al. | 29/426.5 |
| 6,223,427 | B1 * | 5/2001 | Hodgson et al. | 29/822 |
| 6,463,643 | B1 * | 10/2002 | Behling | 29/252 |
| 6,497,435 | B1 * | 12/2002 | Luft et al. | 285/360 |
| RE38,315 | E | 11/2003 | Hodgson et al. | |
| 2006/0214081 | A1 * | 9/2006 | Fang | 248/581 |

FOREIGN PATENT DOCUMENTS
WO    WO 2005/011957    2/2005

OTHER PUBLICATIONS
BUSS Kneader for the Food Industry brochure.

\* cited by examiner

*Primary Examiner* — Essama Omgba
(74) *Attorney, Agent, or Firm* — Fay Sharpe LLP

(57) ABSTRACT

An improved system and method for removing extrusion screw elements includes a puller assembly for removing at least one screw element from a screw shaft of a screw-type extrusion machine. The at least one screw element includes a sleeve portion received annularly about the screw shaft and at least one flute extending radially outward from the sleeve portion. The puller assembly includes a body having a sleeve portion with an inner diameter sufficiently sized for axially fitting over the at least one screw element on the screw shaft. At least one engaging element is removably secured to the body for enabling the body to be axially installed on the at least one screw element when the at least one engaging element is removed from the body and axially locking the body on the at least one screw element when the at least one engaging element is installed in the body. The at least one engaging element extends radially inward relative to the inner diameter of the sleeve portion beyond an outer radial edge of the at least one flute when the at least one engaging element is installed in the body to axially lock the body to the at least one screw element. To remove the at least one screw element from the screw shaft, an axial pulling force is applied to the body to axially move the at least one screw element relative to the screw shaft.

20 Claims, 9 Drawing Sheets

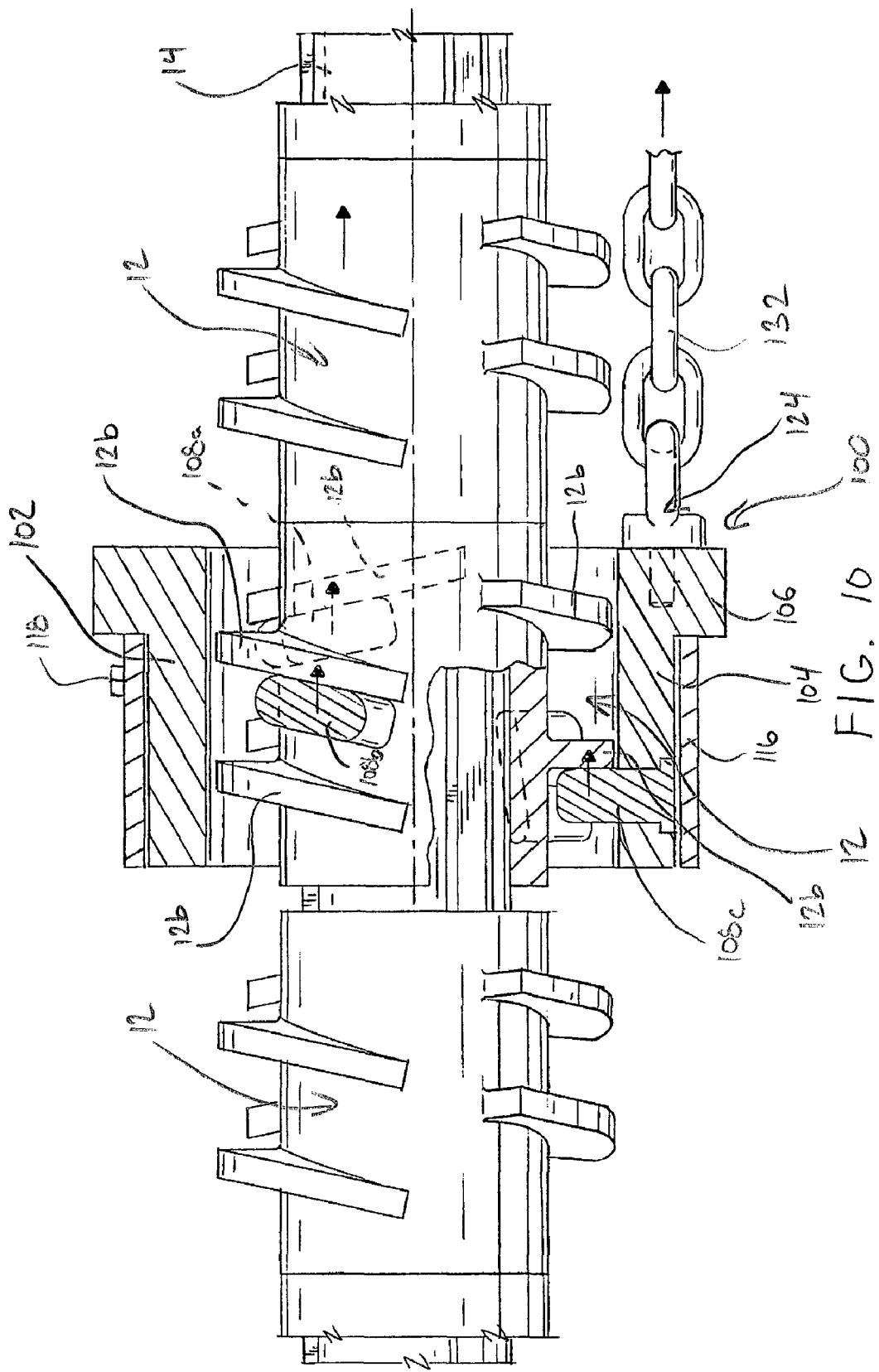

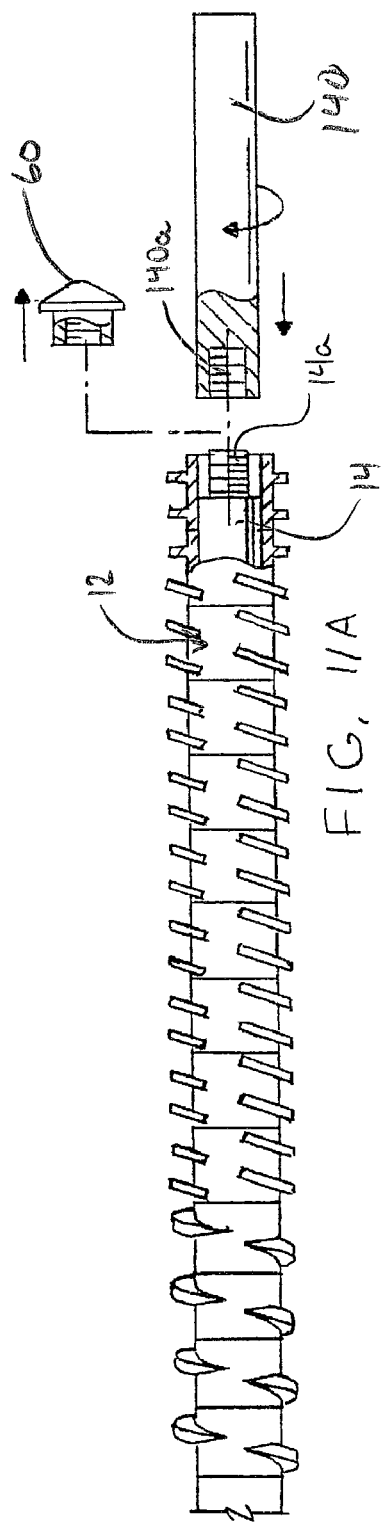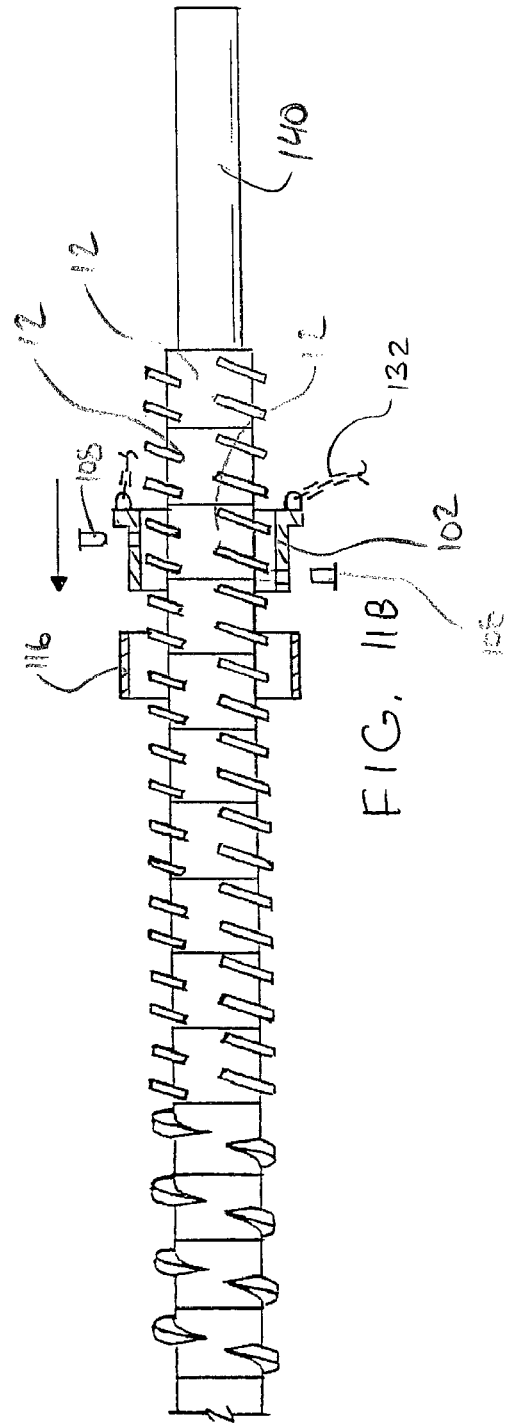
FIG. 11A
FIG. 11B

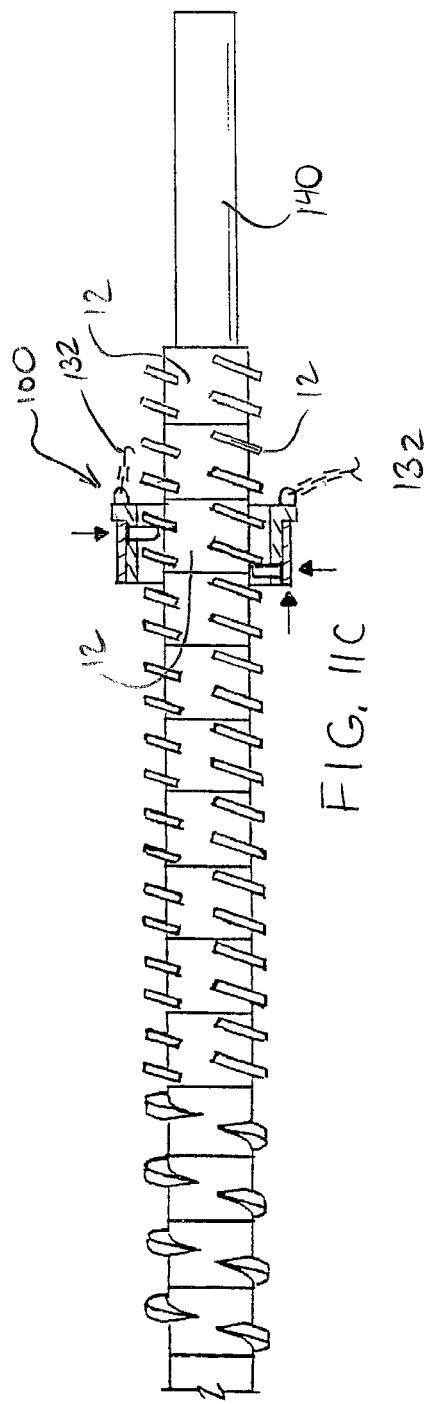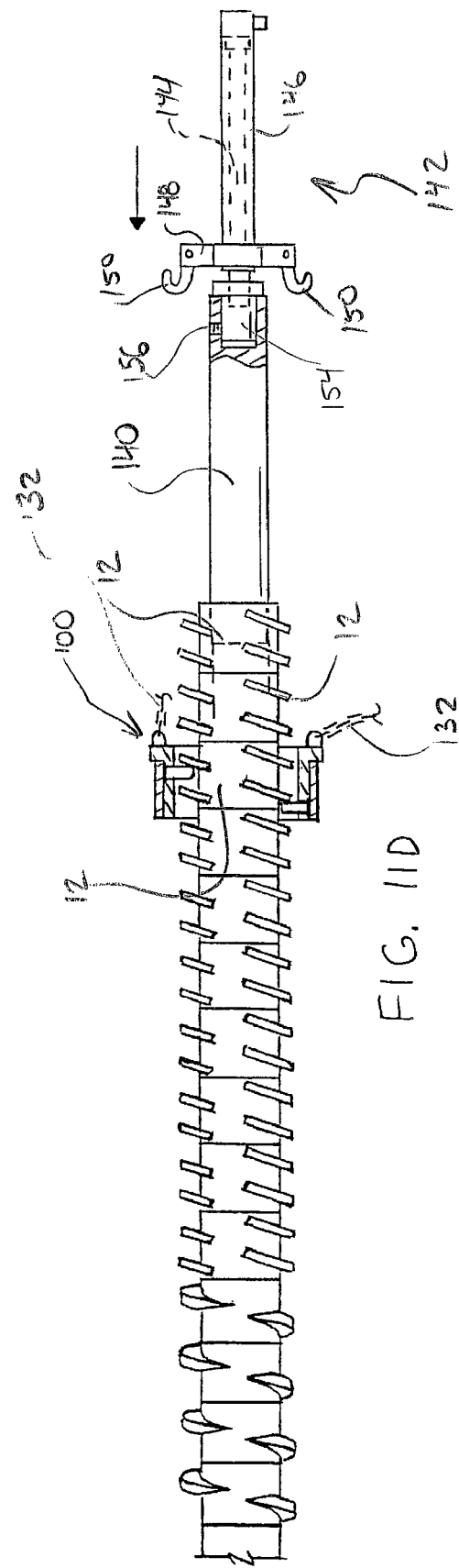
FIG. 11C
FIG. 11D

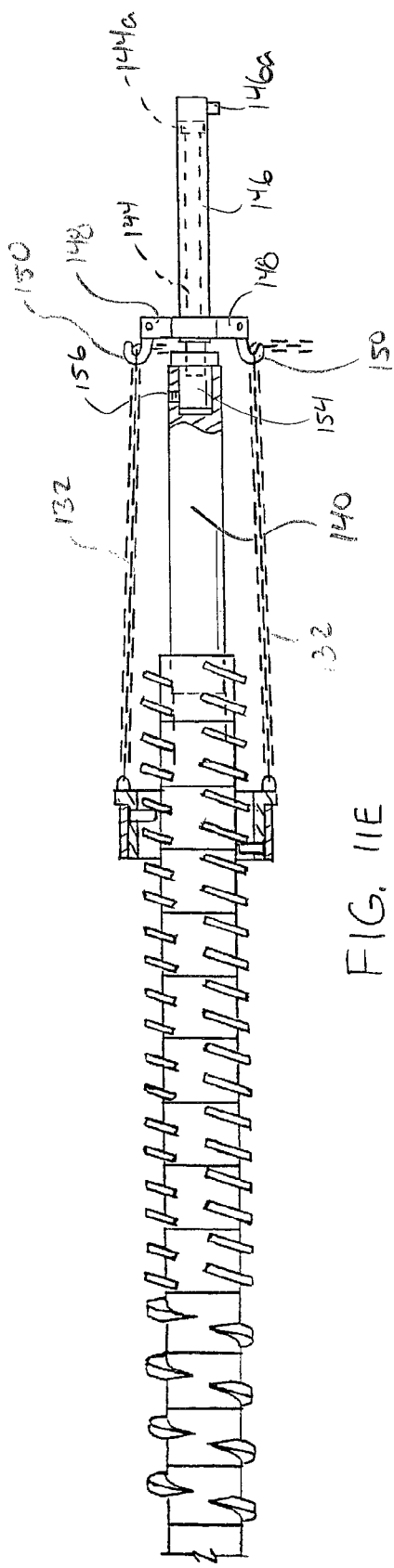
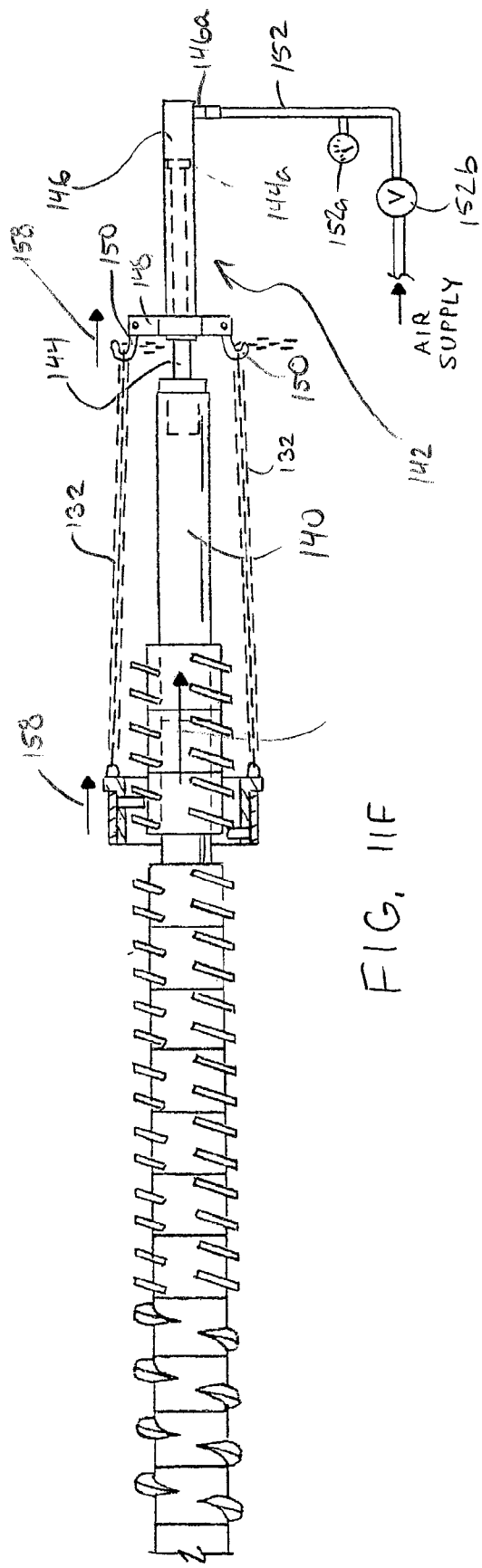
FIG. 11E
FIG. 11F

SYSTEM AND METHOD FOR REMOVING EXTRUSION SCREW ELEMENTS

This application claims priority of Provisional Patent Application Ser. No. 60/760,985, filed Jan. 23, 2006, the contents of which are expressly incorporated herein by reference.

BACKGROUND

The present disclosure generally relates to extruders used in, for example, plastic forming processes, and more particularly, relates to an improved system and method for removing one or more extrusion screw elements from an extruder screw shaft for cleaning, inspection, repairs, replacement, etc.

Extruders are well known and are used extensively in the plastics industry. For example, extruders can be employed in the plastics industry for producing plastic pellets from raw materials. More particularly, raw materials are loaded into a hopper of an extruder which gravity feeds to an extruder screw (or screws) rotatably mounted in a heated barrel or housing. The extruder housing can form a plurality of zones about the screw, including feed, transition, and metering zones. The feed zone conveys the solid or sometimes half-molten or molten raw material out of a feed throat area to the transition zone, which starts compressing the preheated material. Moreover, the transition zone forces the plastic against the heated barrel and continues the melting process, which is usually completed at the beginning of the metering zone. The metering zone typically conveys the molten plastic to a head and die section of the extruder at uniform rates under high pressure. At a die section, the molten plastic passes through a die where it can be continuously formed into round strands or filaments, for example. The strands or filaments can then be passed through a water cooling bath and subsequently fed to a chopper for processing into pellets. As is well known, the pellets can be provided for a variety of applications. Typically, the pellets are used in an injection molding process wherein they are transformed into molded products or articles at high production rates and with good dimensional accuracy.

Conventional extruder screws typically include a rotatable shaft that carries a plurality of screw elements, which can include conveyor elements and/or kneader elements. The elements received on the shaft within the extruder housing are employed to help work and/or convey the product. Each of the elements typically has a central opening therethrough for being annularly received on the shaft. To securely mount a screw element on the shaft, an interference fit arrangement can be provided between the element and the shaft. Other mounting arrangements include the use of one or more slots and a corresponding key provided between the screw elements and the shaft. For example, corresponding slots can be provided on both the screw element and the shaft and a key can be received in the corresponding slots for securely locking the screw element to the shaft. When setting up an extruder, the screw elements can be slid over the shaft from one end, often referred to as the downstream end, and securely held in place against a collar or flange either secured or integrally formed at the other end of the shaft, commonly referred to as the upstream end. Inner surfaces of the screw elements and outer surfaces of the shaft can additionally be splined or serrated to ensure a good coupling between the screw elements and the shaft.

During operation, the extruder often operates at high temperatures and pressures which sometimes forces molten plastic between the screw elements and the shaft and into the splines meshing the screw elements to the shaft. Undesirably, the screw elements often bond to the shaft due to the close tolerances, high temperatures and/or use of highly filled plastics. This can create a problem when desirable to remove one or more of the screw elements from the shaft. Removal or replacement of screw elements from the shaft, sometimes referred to as screw changes, is typically done from time to time. For example, screw changes may be required when going from one type of product to another. Once removed, the screw elements and/or the shaft can be thoroughly cleaned to remove residual plastic from an earlier batch. The cleaned screw elements or new screw elements can be reinstalled on the screw shaft for a subsequent product run. The need for frequent removal of screw elements from the shaft is a problem that has plagued the extruder industry for a long time.

One type of extruder in which screw elements must be removed from the screw shaft from time to time is a BUSS kneader. In the BUSS kneader, a tip of the shaft screw is first removed prior to removal of any of the screw elements. Then, to remove the screw elements, they are often heated to very high temperatures, such as above 900° F., and forced out by using a sledge hammer and a brass bar (so-called "heat and beat" technique). More particularly, to employ this method, an operator places a brass hammer against the element and another operator hits the brass hammer with a sledge hammer until the screw element starts to axially move along the screw shaft.

This removal process can be unsafe because it may put the operator in a perilous position. For example, the operator may have to get on top of the screw element to bang on the sledge hammer. The operator is more likely to slip and fall because of improper footing in this position, and further because a lot of oil from oil lines of the extruder and powder on the screw could cause the operator to slip. In addition, this method of removing screw elements from the shaft is undesirable due to the damage it can cause to the microstructure and/or the dimensional accuracy of the screw elements and the shaft. The hardened and wear resistant screw shaft and elements are particularly susceptible to cracking and stress fracturing. Also, local overheating, which is sometimes used to assist in screw element removal, can cause deformation of the screw elements. In addition to the safety factors and likelihood of damaging the extruder equipment, there is also a concern for the significant amount of time required for removing the screw elements from an extruder shaft. The lengthy amount of time needed for the typical removal of a screw element from the extruder shaft results in an equal amount of machine downtime or lost productivity.

SUMMARY

According to one aspect, a puller assembly is provided for removing at least one screw element from a screw shaft of a screw-type extrusion machine. The at least one screw element includes a sleeve portion received annularly about the screw shaft and at least one flute extending radially outward from the sleeve portion. More particularly, in accordance with this aspect, the puller assembly includes a body having a sleeve portion with an inner diameter sufficiently sized for axially fitting over the at least one screw element on the screw shaft. At least one engaging element is removably secured to the body for enabling the body to be axially installed on the at least one screw element when the at least one engaging element is removed from the body and axially locking the body on the at least one screw element when the at least one engaging element is installed in the body. The at least one engaging element extends radially inward relative to the inner diameter of the sleeve portion beyond an outer radial edge of the at least one flute when the at least one engaging element is installed in the body to axially lock the body to the at least one screw element.

According to another aspect, a method is provided for removing at least one screw element from a screw shaft of a screw-type extrusion machine. The at least one screw element includes a sleeve portion received annularly about the screw shaft and at least one flute extending radially outward from the sleeve portion. More particularly, in accordance with this aspect, a puller collar is axially installed onto the at least one screw element. At least one engaging element is installed on the puller collar to axially lock the puller collar to the at least one screw element. The at least one engaging element extends radially inward relative to an inner diameter of the puller collar beyond an outer radial edge of the at least one flute. An axial pulling force is applied to the puller collar to axially move the at least one screw element relative to the screw shaft.

According to yet another aspect, a puller assembly is provided for removing at least one screw element from a screw shaft of a screw-type extrusion machine. The at least one screw element is received annularly about the screw shaft with at least one flute extending radially outward. More particularly, in accordance with this aspect, the puller assembly includes a body having a sleeve portion with an inner diameter appropriately sized for receipt of the at least one screw element on the screw shaft. A plurality of engaging elements extends radially inward relative to the inner diameter of the body beyond an outer radial edge of the at least one flute of the at least one screw element. One of the plurality of engaging elements is removable from the body for enabling the body to be axially installed on the at least one screw element when said one of the plurality of engaging elements is removed from the body and the plurality of engaging elements axially locking the body on the at least one screw element when said one of the plurality of engaging elements is installed on the body.

BRIEF DESCRIPTION OF THE DRAWINGS

FIG. 10 is a side elevational view, shown in partial cross-section, of the puller assembly installed on a screw element of the extrusion machine.

FIGS. 11A-11F illustrate a process of removing screw elements from a screw shaft of an extrusion-type machine using the improved puller assembly of the present disclosure.

DETAILED DESCRIPTION

Figure 1:
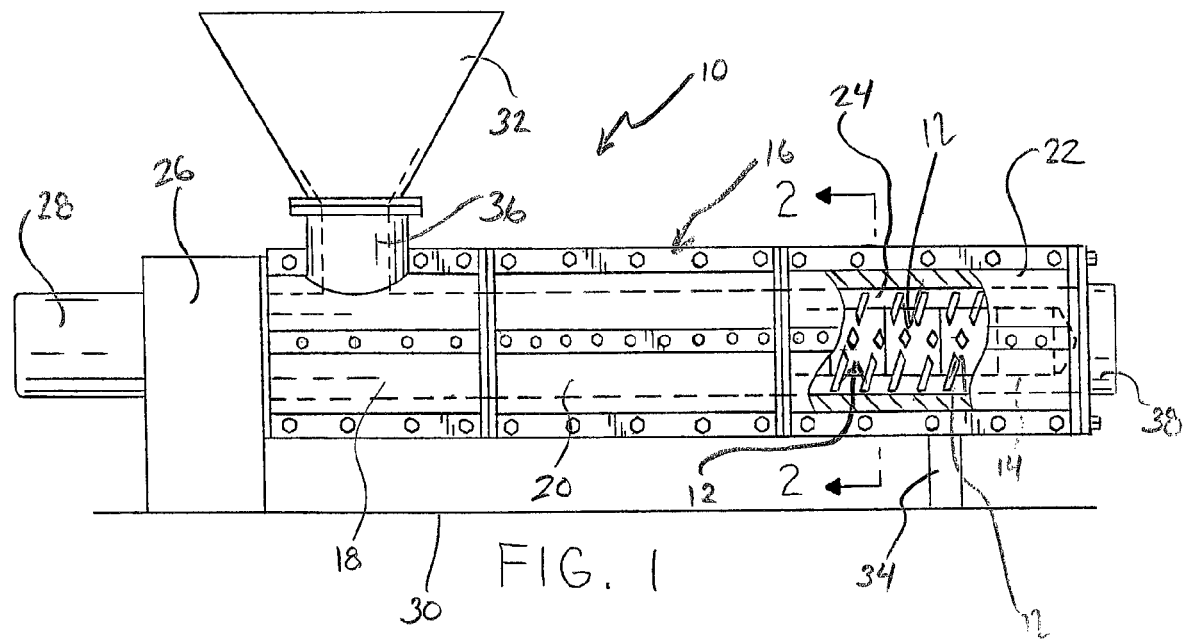
FIG. 1 is an elevational view of a screw-type extrusion machine shown partially in cross-section to reveal screw elements which are received on a screw shaft of the extrusion machine.

Referring now to the drawings wherein the showings are for purposes of illustrating one or more exemplary embodiments, FIG. 1 schematically shows a screw-type extrusion or extruding machine generally indicated by reference numeral 10. The extrusion machine 10 employs a plurality of screw elements 12 received on a screw shaft 14 of the extrusion machine. The screw elements 12 can be kneader elements, conveyor elements, or a combination of kneader and conveyor elements (the screw elements 12 shown in FIG. 1 are kneader elements). As show, the screw shaft 14 with its plurality of screw elements 12 received thereon can be enclosed within a housing 16.

In particular, the extrusion housing 16 can include a plurality of sections, including upstream section 18, middle section 20 and downstream section 22. The sections can be disposed axially, one behind the other, and flanged to one another. The housing 16, and particularly the housing sections 18,20,22, can define a screw receiving bore or cavity 24 in which the screw shaft 14 and screw elements 12 are received. In the illustrated embodiment, the extrusion machine is depicted as being in a single-screw configuration wherein only a single screw shaft 14 is received within the cavity 24 defined by the housing 16. However, as will be understood and appreciated by those skilled in the art, the extrusion machine 10 could be provided in a twin-screw orientation wherein the machine's housing and cavity would be appropriately sized to receive a pair of screws or screw shafts each having a plurality of screw elements received thereon. In any case, the screw shafts of the extrusion machine 10, such as screw shaft 14 of illustrated machine 10, can be driven through a gear box or gear box housing 26 by a motor 28.

Although other configurations are contemplated, the illustrated machine 10 has the gear box 26 resting on a support surface 30. A receiving hopper 32 is provided for feeding raw materials into the machine 10 and a stand 34 is provided for securing the housing 16 with the gear box 26 above the support surface 30. The receiving hopper 32 particularly feeds the housing 16 through a stack portion 36 provided along the upstream housing section 18. As is known to those skilled in the art, some sort of outlet or housing end cap 38 is provided on a downstream end of the housing 16, i.e., on a downstream end of the downstream section 22.

Figure 2:
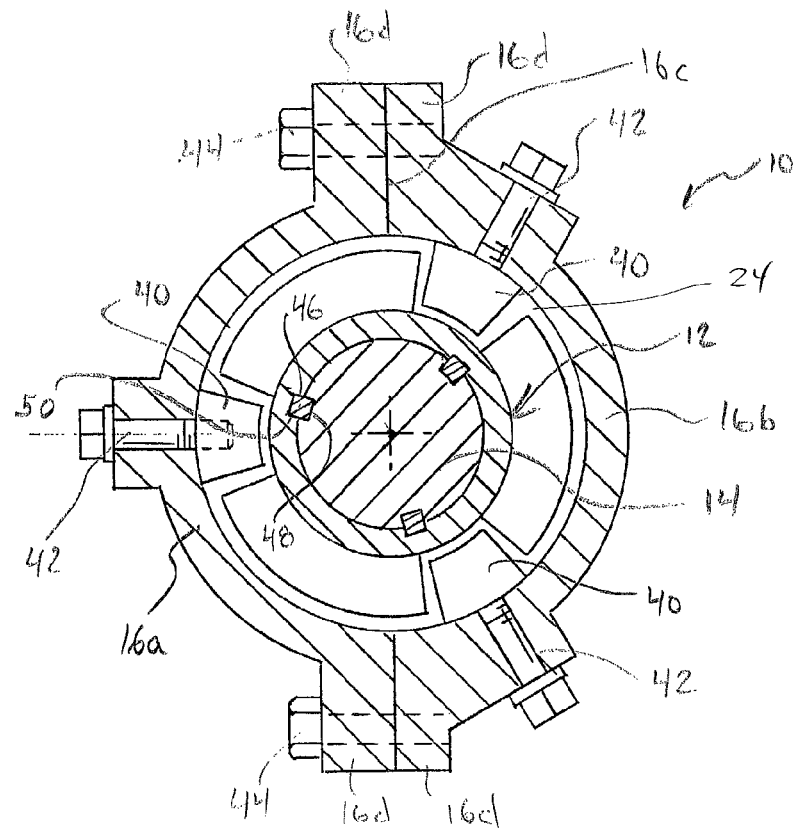
FIG. 2 is a partial cross-sectional view of the screw-type extrusion machine taken along line 2-2 of FIG. 1.

The screw elements 12, including the kneader elements illustrated in FIGS. 1 and 2, can include a sleeve or body portion 12a and a plurality of radially extending kneader flights 12b. As particularly shown in FIG. 2, each kneader element 12 can include three flights extending radially outward from body portion 12a and circumferentially disposed thereabout. The extrusion machine 10, particularly the housing 16, can have a plurality of kneading pins or teeth 40 extending radially inward into the cavity 24 in which the shaft 14 and screw elements 12 are disposed. As illustrated, the kneading teeth 40 can also be circumferentially spaced about the housing 16. Suitable fasteners, such as bolt assemblies 42, can be provided for securing the teeth 40 to the housing 16.

As shown, the housing 16 can be formed of a pair of mating housing halves, including first housing half 16a and second housing half 16b. The housing halves 16a, 16b can meet along a parting line 16c and be provided with flanged portions 16d. Suitable fasteners, such as bolts 44 can be secured through apertures defined in the flange portions 16d for securing the housing halves 16a, 16b together. As illustrated, the kneader body 12a and the extruder shaft 14 can be provided with the corresponding slots 46,48 (i.e., radially aligned slots) in which keys 50 can be received for securing the screw elements 12 to the screw shaft 14. In particular, as is well understood in the art, the configuration of the keys 50 can be slightly oversized relative to the slots 46,48 to provide an interference fit between the key and the respective shaft 14 and kneader element 12.

Figure 3:
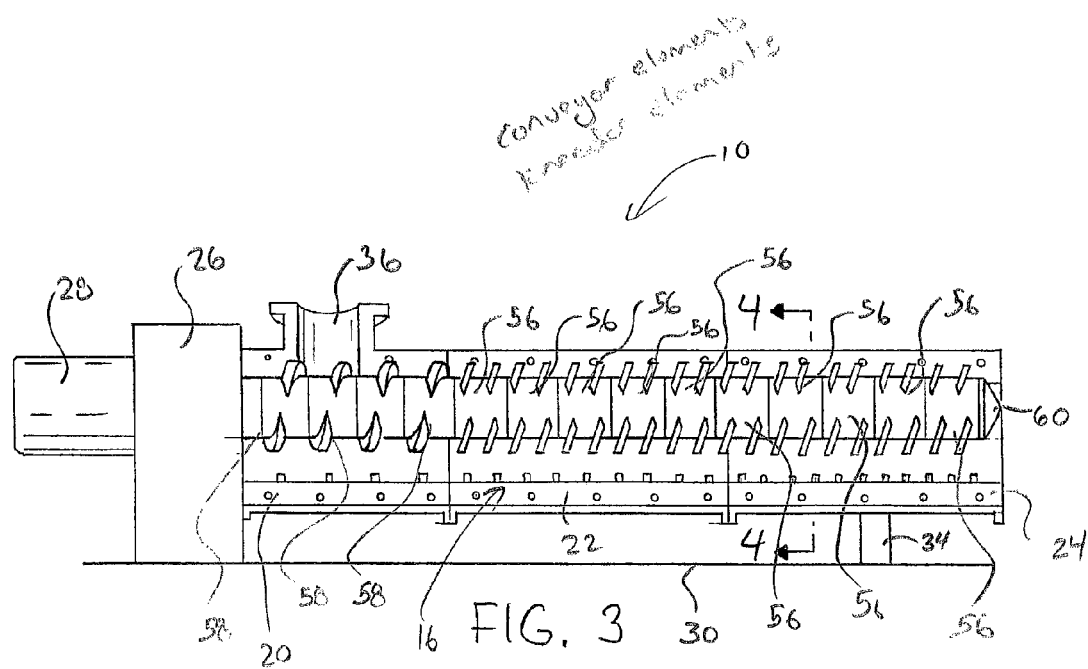
FIG. 3 is an elevational view of the screw-type extrusion machine shown with a portion of the machine's housing removed revealing a plurality of screw elements disposed along an axial extent of the screw shaft.

Turning to FIG. 3, the extrusion machine 10 is shown with housing portion or half 16a removed so as to show the plurality of screw elements 12 received along an axial extent of the shaft 14. In particular, the screw elements 12 shown in FIG. 3 include kneader elements 56 disposed along the shaft 14 in the middle and downstream housing sections 20,22, and further includes conveyor elements 58 disposed along the shaft in the upstream housing section 18. Though configured slightly differently, the kneader elements 56 and conveyor elements 58 both include a sleeve portion, such as sleeve portion 12a, received annularly about the screw shaft 14 and at least one flute 12b extending radially outward from the sleeve portion 12a. A shaft end cap 60 can be provided on a distal or downstream end of the shaft 14 to further secure the screw elements 56,58 on the shaft 14.

Figure 4:
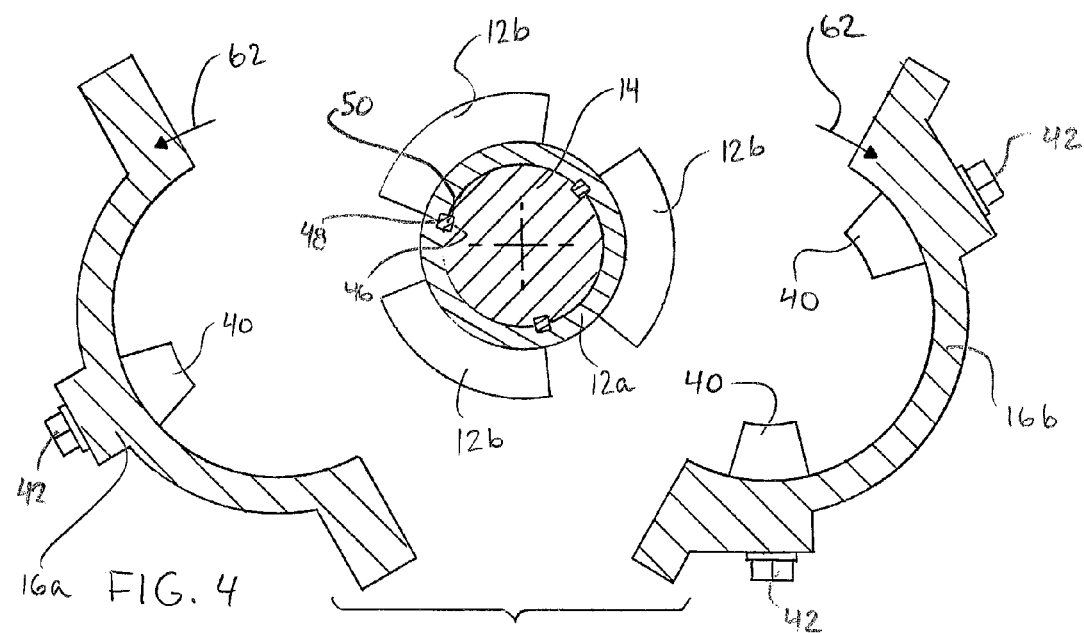
FIG. 4 is a partial cross-sectional view of the screw-type extrusion machine shown with housing portions of the extrusion machine pivoted away from one another to provide access to the screw shaft and the screw elements received thereon.
Figure 5:
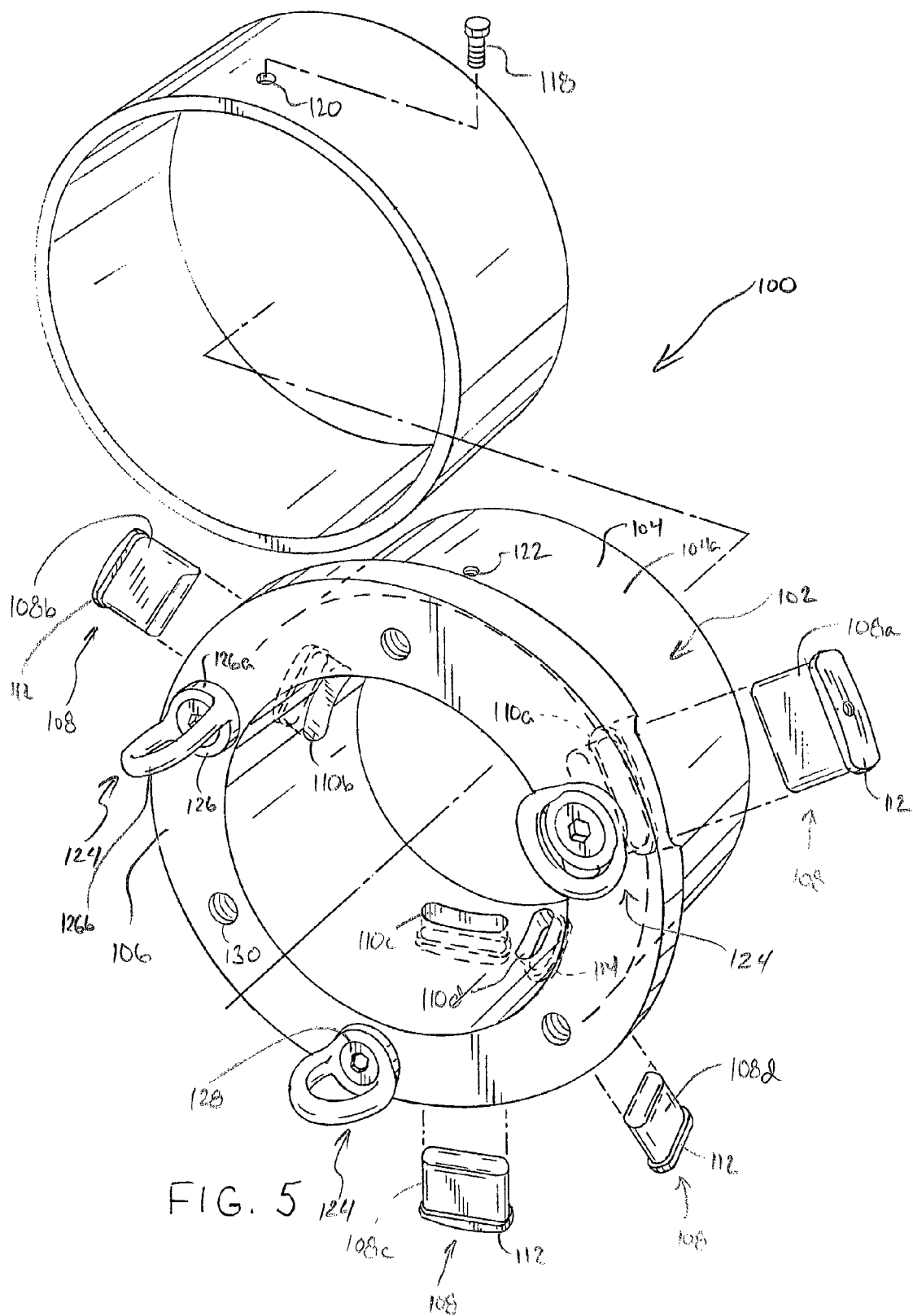
FIG. 5 is an exploded perspective view of a puller assembly for removing screw elements from the screw shaft of the extrusion machine.
Figure 6:
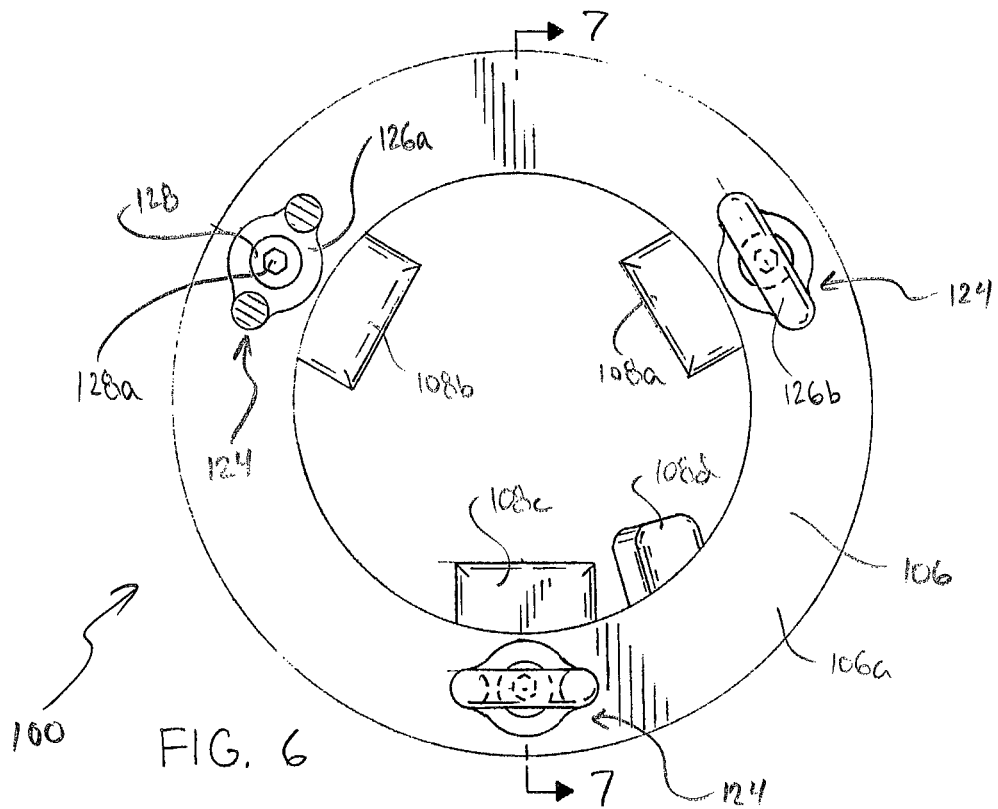
FIG. 6 is a first axial end elevational view of the puller assembly of FIG. 5.

With additional reference to FIG. 4, the illustrated extrusion machine 10 can be vertically split along parting line 16c which facilitates opening and closing of the housing halves or portions 16a,16b. More particularly, the halves 16a,16b can be pivotally opened as indicated by arrows 62, while the screw 14 remains in position. This enables the housing portions 16a, 16b to be moved out of the way and allows easy access to the screw 14 and the screw elements 12 disposed along the screw 14. Access to the screw elements 12 on the screw shaft 14 may be desirable when necessary to remove one or more screw elements 12 from the screw shaft 14 or for other maintenance. In other extrusion machines (e.g., a twin screw extruder), access to the screw or screws may be achieved in a different manner. For example, in some double screw extruders, the screws are entirely removed from the machine and such removal may be necessary for removing or changing screw elements on the screw shaft.

With reference to FIGS. 5-8, a puller assembly 100 is shown for removing at least one screw element from a screw shaft of a screw-type extrusion machine, such as screw element 12 from screw shaft 14 of the screw-type extrusion machine 10 of FIGS. 1-4. As illustrated, the puller assembly 100 includes a body 102 having a sleeve portion 104 with an inner diameter sufficiently sized for axially fitting over the screw elements 12 on the screw shaft 14. The body 102 of the depicted puller assembly 100 additionally includes a radial flange portion 106. The puller assembly 100 further includes at least one engaging element 108 removably secured to the body 102 for enabling the body to be axially installed on at least one screw element, such as screw element 12, when the at least one engaging element 108 is removed from the body and axially locking the body on the at least one screw element when the at least one engaging element 108 is installed in the body.

The illustrated puller assembly 100 includes three such engaging elements 108a, 108b, 108c, also referred to herein as removable axial pins or teeth, circumferentially disposed about the sleeve portion 104 of the body 102. In particular, the engaging elements 108a-c extend radially inward relative to the inner diameter of the sleeve portion 104 beyond an outer radial edge of at least one flute of at least one screw element, as will be described in more detail below, when the engaging elements 108a-c are installed in the body 102 to axially lock the body to the at least one screw element. The illustrated puller assembly 100 additionally includes at least one anti-rotation element, a fourth engaging element 108d (also referred to herein as a removable radial tooth or pin), that is removably secured to the body 102 and extends radially inward relative to the inner diameter of the sleeve portion 104 beyond an outer radial edge of at least one flute of a screw element to which the puller assembly 100 is secured to prevent a significant relative rotation between the body 102 and the screw element. In the illustrated embodiment, each of the engaging elements 108a-c has a radial width that is substantially greater than an axial width. In contrast, the anti-rotation element 108d has an axial width that is substantially greater than a radial width.

In an alternate configuration, the engaging elements 108a-c are formed integrally with the body 102 or semi-permanently secured to the body (i.e., not necessarily removed for using the puller assembly to remove screw elements from a shaft). In one version of this alternate configuration, only the anti-rotation element 108d need be removed when installing or removing the puller assembly from a particular screw element. Of course, as will be understood and appreciated by those skilled in the art, other configurations are possible and contemplated. For example, one or more of the engaging elements 108a-c could also be removable, like the illustrated embodiment, in addition to element 108d.

Figure 7:
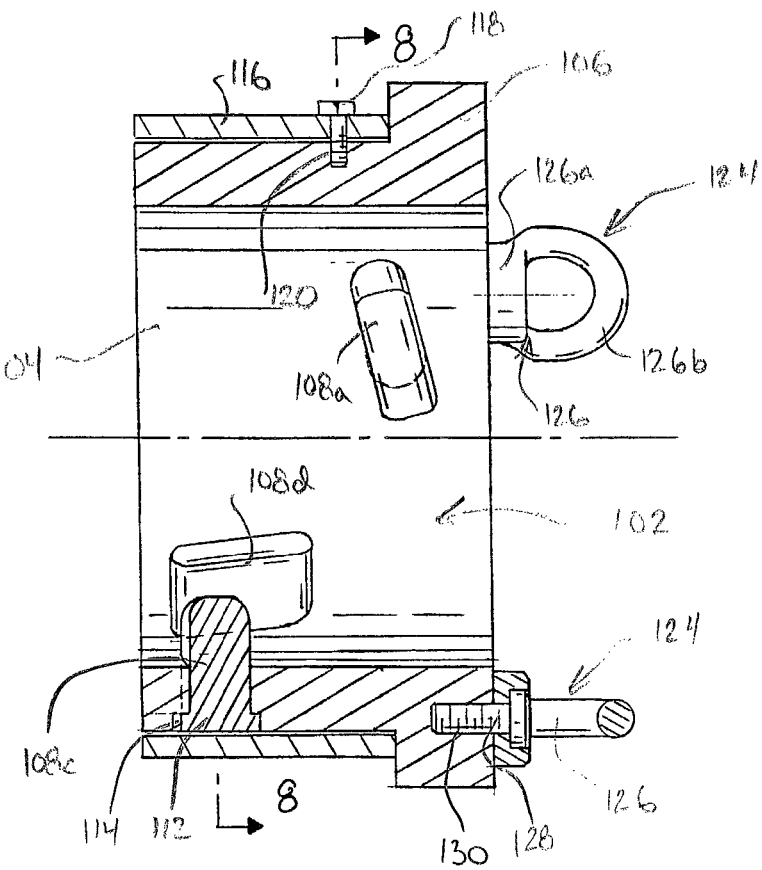
FIG. 7 is a cross-sectional view of the puller assembly taken along the line 7-7 of FIG. 6.
Figure 8:
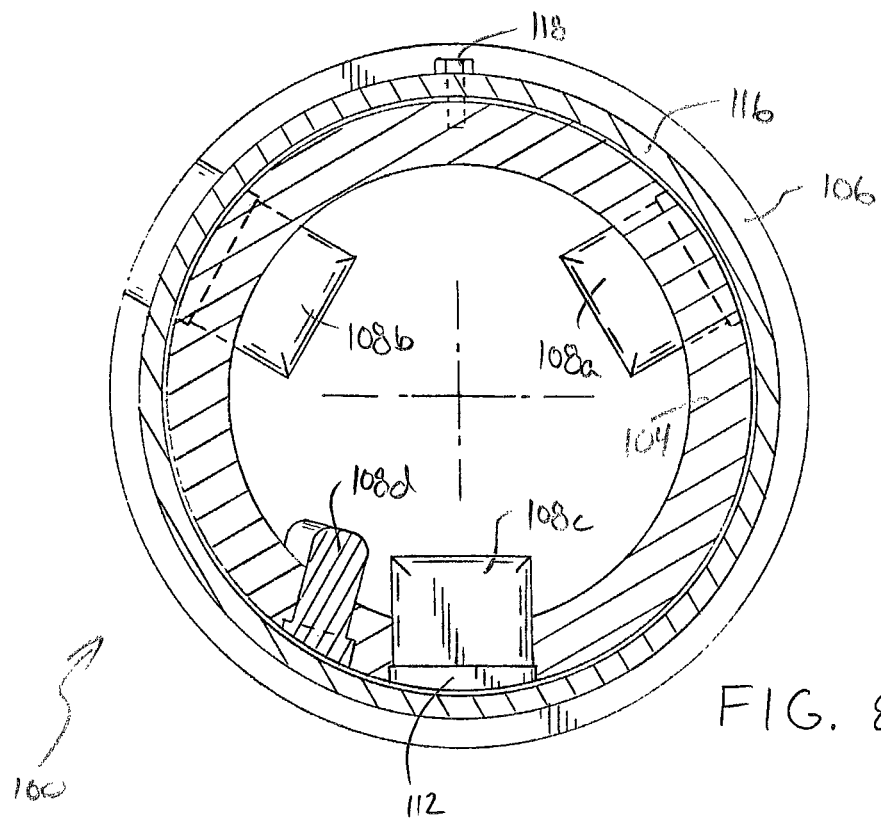
FIG. 8 is a cross-sectional view of the puller assembly taken along the line 8-8 of FIG. 7.

Returning to the illustrated embodiment, the body 102, and specifically the sleeve portion 104, includes a plurality of receiving apertures or recesses 110 into each of which a corresponding one of the engaging elements 108a-d is received. In one embodiment, the engaging elements 108a-d are all similarly constructed and therefore interchangeable. Thus, engaging element 108a could be used in association with aperture 110d, for example. Each of the engaging elements 108 includes a pin flange or head portion 112a that is received in a mating counterbore 114 as best illustrated in FIG. 7. The engagement between the head portion 112a and the reception by the counterbore 114 limits radial insertion of the engaging elements into the sleeve portion 104 while allowing the engaging elements to rest below a surface of the sleeve portion 104a. In other words, the head portion 112a of each engaging element 108 is enlarged relative to an elongated portion 112b of the engaging elements 108.

The puller assembly 100 can further include a sleeve member 116 which can be annularly received over the sleeve portion 104 of the body 102 to lock the engaging elements 108a-d in the plurality of receiving apertures 110a-d. Specifically, the sleeve member 116 can be received over the sleeve portion 104 such that one end of the sleeve member 116 is adjacent or abutting the flange portion 106 of the body 102 as illustrated in FIG. 7. Thus, the flange portion 106 limits axial movement of the sleeve member 116 along the sleeve portion 104 at least in one axial direction. A securing or locking device, such as bolt 118, can connect the sleeve member 116 to the body, and specifically the sleeve portion 104 in the illustrated embodiment, to limit relative movement between the sleeve member 116 and the body 102. In the illustrated embodiment, the bolt 118 is received through an aperture 120 defined in the sleeve member 116 and threadedly received in a threaded aperture 122 defined in the sleeve portion 104.

As illustrated, the flange portion 106 of the body 102 can include or have secured thereto a plurality of axial pulling assemblies 124. Each of the pulling assemblies 124 can have a loop member 126 which facilitates pulling of the body 102 to axial move at least one screw element axially relative to its associated screw shaft as will be described in further detail below. More particularly, each loop member 126 can be formed of a base 126a which abuts a face or surface 106a of the radial flange portion and a loop 126b which provides a structure for being readily connected with and pulled. The loop member 126 is secured to the body 102 by a suitable fastener, such as fastener 128. Specifically, fastener 128 can be a bolt or the like received through an aperture defined in the base 126a (and counterbore if desirable) and threadedly engaged within a threaded aperture 130 defined in the body 102 (see FIG. 7).

Figure 9:
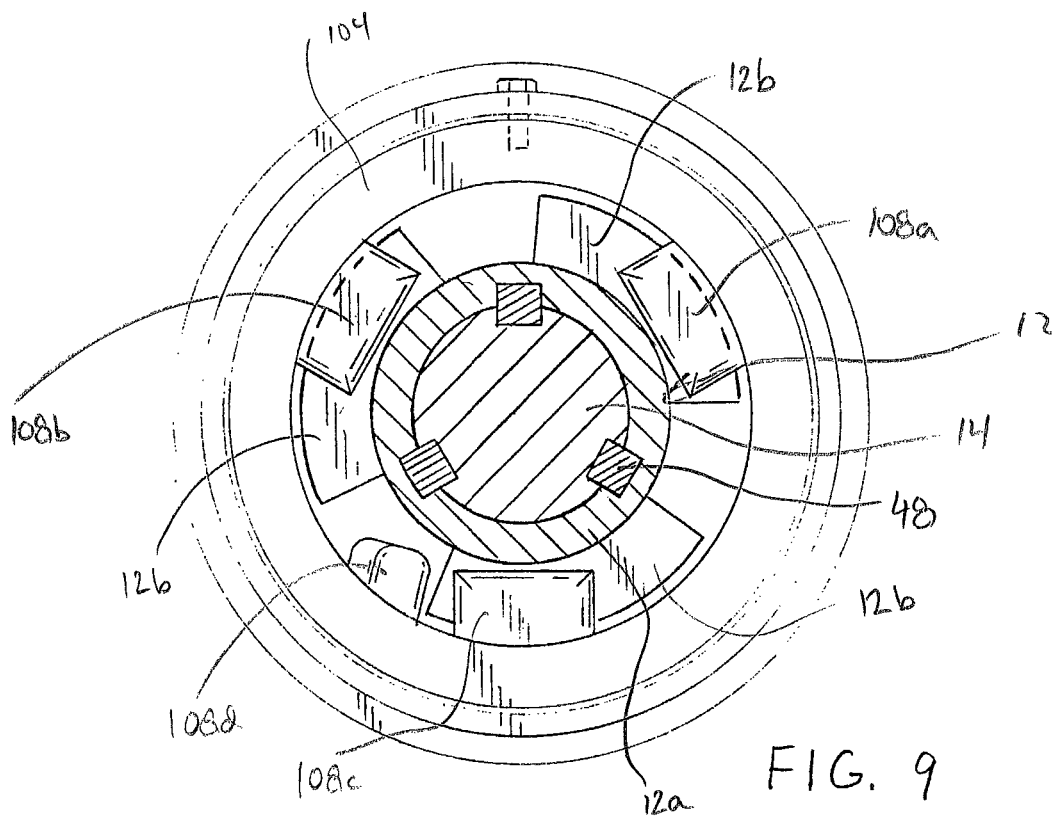
FIG. 9 is a second, opposite axial end elevational view of the puller assembly installed on the screw shaft and one or more of the screw elements of the extrusion machine (the screw shaft and at least one screw element shown in cross section).

As will be described in further detail below, a chain, such as chain 132 shown in FIG. 10, can be connected to each of the loop members 126 and further connected at a location spaced from the body 102 to a pulling device that selectively applies an axial pulling force to the body 102 to axial move at least one screw element along its screw shaft upon actuation of the pulling device. In particular, the engaging elements 108a-c will engage one or more flutes of one or more screw elements to thereby axially force the screw elements to move along their shaft. This arrangement is illustrated in FIG. 9 wherein the circumferentially disposed engaging elements 108a-d are arranged so as to engage corresponding circumferentially disposed flutes 12b of a screw element 12. The flutes 12b extend radially outward from a sleeve portion 12a of a screw element as already described herein. The engaging elements 108a-c extend radially inward from the sleeve portion 104 a distance sufficient to axially lock the sleeve portion 104 to the screw element 12.

With additional reference to FIGS. 10 and 11A-F, the puller assembly 100 can further include a pulling device for selectively applying an axial pulling force to the body 102 to axially move one or more screw elements along a screw shaft. The pulling device can include an extension shaft 140 which can be removably secured to one end of a screw shaft 14. The pulling device can further include a puller shaft tail piece 142 which can be secured to the end of the extension shaft 140. The puller shaft tail piece 142 can include a first shaft member 144 having a second shaft member 146 telescopingly received therein. A collar 148 can be provided about the second, outer shaft member 146 and adapted for movement with the shaft member 146 relative to the shaft member 144. One or more connector elements, such as chains 132, can connect to each of the body 102 and the collar 148. More particularly, chains 132 can be connected to the loop members 126 of the body 102 and connected to hooks 150 provided circumferentially about the collar 148.

The pulling device can further include a drive assembly that, upon actuation, moves the outer shaft 146 and the collar 148 axially relative to the shaft member 144 which can be fixedly secured to shaft 14 and through the chains 132 axially moves the body 102 to move one or more screw elements 12 along a screw shaft 14. The drive assembly can be any type of known powered assembly including appropriate components for axially driving the shaft member 144 and the collar 146 relative to the shaft member 146. In addition, the drive assembly can include any appropriate mechanical linkages, solenoids, screw drives, hydraulic or pneumatic cylinders, etc. and motors for driving these components such as pneumatic, hydraulic, electric, etc. In one embodiment, the drive assembly is a pneumatic device connected to a compressed air source through appropriate tubing or conduits 152. The pneumatic device 146 forcibly moves the collar 148 and shaft member 146 axially relative to the inner shaft member 144 and the extension shaft 140 upon actuation.

Continuing reference to FIGS. 10 and 11A-F, a method of removing at least one screw element from a screw shaft of a screw-type extrusion machine will now be described. The screw element or elements being removed can be like screw elements 12 described hereinabove and disposed along screw shaft 14 of screw-type extrusion machine 10. Thus, a preliminary step may be necessary to access the screw shaft 14 and screw elements 12 on the shaft. If the shaft 14 is disposed in a machine like machine 10 of the present disclosure, access to the shaft 14 is achieved by opening the housing halves (see FIG. 4). In a double or twin screw extruder, the shaft may have to be entirely removed from its machine to access the screw elements. Once the shaft is accessible, where applicable, shaft end cap 60, also referred to herein as a tip element, is first removed from an end of the screw shaft 14 (as illustrated in FIG. 11A). The extension shaft 140 is then threadedly connected to the end of the screw shaft 14. As shown, the screw shaft 14 can include a threaded portion 14a that engages with a threaded portion 140a of the extension shaft 140. Alternatively, an adapter may be used for connecting the extension shaft 140 to the screw shaft 14.

Next, as shown in FIG. 11B, the sleeve member 116 and subsequently the puller collar (i.e., the body 102) can be axially installed onto one of the screw elements 12 disposed along the shaft 14. It is contemplated that the puller assembly 100 described herein could be used for moving any number of screw elements 12 along a screw shaft 14; however, it has been found that three screw elements may be an appropriate number of elements to attempt to be removed initially. Accordingly, in FIG. 11B, the body 102 is shown being secured about a screw element that is third from the end of shaft 14 such that the puller assembly 100 will be used for removing three screw elements from the shaft 14. Once the body 102 is positioned about a desired screw element 12, the engaging elements 108 can be inserted into the body 102 and the sleeve member 116 axially installed on the sleeve portion 104 as shown in FIG. 11C. Installation of the engaging elements 108, particularly engaging elements 108a-c, axially locks the body 102 to the screw element 12 that it is annularly disposed about. More particularly, such axial locking occurs because the engaging elements 108a-c extend radially inward relative to an inner diameter of the body 102, particularly sleeve portion 104 of the body, beyond an outer radial edge of the flutes disposed on the screw element 12 to which the body 102 is being attached.

If not already secured to the loop members 126 of the pulling assemblies 124 circumferentially disposed about the flange portion 106 of the body 102, the chains 132 can now be connected. The puller shaft tail piece 142 can then be secured to the end of the extension shaft 140 as shown in FIG. 11D. In particular, an adapter 154 can be used to connect the inner shaft 144 to the extension shaft 140. In the illustrated embodiment, the adapter 154 has a shaft portion received within the extension shaft 140 and a radial head portion limiting axial receipt within the shaft 140. A locking member 156 can be used to lock the adapter 154 to the extension shaft 140. Next, the chains 132 can be used to connect the collar 148 to the body 102. In the illustrated embodiment, the drive assembly for moving the puller assembly 100 is pneumatically driven. In particular, as shown in FIG. 11F, the tail piece 142 can be connected to an air supply through hose 152. More specifically, the outer shaft member 146 can include a fitting 146a for connecting to one end of the air hose 152 and directing compressed air from the hose 152 into the outer shaft member 146. As show, the inner shaft member 144 can include a flange portion 144a received in the outer shaft member 146. When delivered, compressed air from the hose 152, which can include appropriate controls (e.g. pressure gage 152a and valve 152b), can act against the flange portion 144a to move the outer shaft 146 telescopingly and axially relative to the inner shaft (i.e., to the right in FIG. 11F). Since the collar 148 is fixedly secured to the outer shaft 146, movement of the outer shaft causes movement of the collar 148 relative to the inner shaft and also relative to the extension shaft 14 (shafts 140 and 14 are fixedly secured to the inner shaft 144).

As a result, an axial pulling force can then be applied to the body 102 to axially move the screw element 12 relative to the screw shaft 14 as illustrated in FIG. 11F by arrows 158. Since the screw element 12 to which the body 102 is secured is the third screw element from the end, the three right most screw elements 12 in FIG. 11F are moved along the screw shaft 14 and onto the extension shaft 140. This process can then be repeated to remove any other screw elements that it is desirable to remove from the shaft 14. In the event that it is too difficult to remove multiple screw elements from a screw shaft, the body 102 can be secured to a screw element that will result in fewer screw elements being moved at a time by the driving assembly.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A puller assembly for removing at least one screw element from a screw shaft of a screw-type extrusion machine, the at least one screw element including a sleeve portion received annularly about the screw shaft and at least one flute extending radially outward from the sleeve portion, said puller assembly comprising:
   a body having a sleeve portion with an inner diameter sufficiently sized for axially fitting over the at least one screw element on the screw shaft;
   at least one engaging element removably secured to said body for enabling said body to be axially installed on the at least one screw element when said at least one engaging element is removed from said body and axially locking said body on the at least one screw element when said at least one engaging element is installed in said body, said at least one engaging element extending radially inward relative to said inner diameter of said sleeve portion beyond an outer radial edge of the at least one flute when said at least one engaging elements is installed in said body to axially lock said body to the at least one screw element; and
   a pulling device for selectively applying an axial pulling force to said body to axially move said at least one screw element along said screw shaft, said at least one engaging element engaging said at least one flute to thereby axially force said at least one engaging element to move along said shaft,
   wherein said pulling device includes:
   an extension shaft removably secured to one end of said screw shaft;
   a puller shaft tailpiece annularly disposed on said extension shaft and axially spaced apart from said body;
   at least one connector element connected to each of said body and said puller shaft tailpiece; and
   a drive assembly that, upon actuation, moves said puller shaft tailpiece axially along said extension shaft and through said at least one connector element axially moves said body to move said at least one screw element along said screw shaft.

2. The puller assembly of claim 1 wherein said drive assembly is a pneumatic device connected to a compressed air source, said pneumatic device forcibly moving said puller shaft tailpiece axially along said extension shaft upon actuation.

3. The puller assembly of claim 1 wherein said at least one connector element is a plurality of chains extending between said body and said puller shaft tailpiece.

4. The puller assembly of claim 3 wherein said plurality of chains includes at least three chains connected to said puller shaft tailpiece at locations circumferentially spaced about said puller shaft tailpiece and connected to said body at locations circumferentially spaced about said body.

5. The puller assembly of claim 1 wherein said extension shaft has a threaded end threadedly engaged with said one end of said screw shaft.

6. The puller assembly of claim 1 wherein said at least one screw element is a kneader element or a conveyor element.

7. The puller assembly of claim 1 wherein said at least one engaging element includes at least three engaging elements circumferentially spaced around said body, each of said engaging elements having a radial width substantially greater than an axial width.

8. The puller assembly of claim 7 further including at least one anti-rotation element removably secured to said body and extending radially inward relative to said inner diameter of said sleeve portion beyond said outer radial edge of the at least one flute to prevent significant relative rotation between said body and the at least one screw element.

9. The puller assembly of claim 8 wherein said at least one anti-rotation element has an axial width substantially greater than a radial width.

10. The puller assembly of claim 1 wherein said body includes a plurality of receiving apertures into each of which a corresponding one of said at least one engaging elements is received.

11. The puller assembly of claim 10 wherein each of said at least one engaging elements includes a head portion that is enlarged relative to an elongated portion to limit insertion of said at least one engaging element in said plurality of receiving apertures.

12. The puller assembly of claim 11 wherein each of said plurality of receiving apertures includes a counterbore for receiving said head portion and limiting insertion of said at least one engaging element in said plurality of receiving apertures.

13. The puller assembly of claim 10 further including:
   a sleeve member annularly received over said sleeve portion to lock said at least one engaging element in said plurality of receiving apertures.

14. The puller assembly of claim 13 further including a securing device connecting said sleeve member to said body to limit relative movement therebetween.

15. The puller assembly of claim 13 wherein said body includes a flange portion that limits axial movement of said sleeve member along said sleeve portion.

16. The puller assembly of claim 15 wherein said flange portion includes a plurality of axial pulling assemblies each having loop members for facilitating axial pulling of said body to axially move the at least one screw element axially relative to the screw shaft.

17. The puller assembly of claim 16 further including:
a chain connected to each of said loop members and further connected at a location spaced from said body to a pulling device that selectively applies an axial pulling force to said body to axially move said at least one screw element along said screw shaft upon actuation, said at least one engaging element engaging said at least one flute to thereby axially force said at least one screw element to move along said shaft.

18. A method of removing at least one screw element from a screw shaft of a screw-type extrusion machine, the at least one screw element including a sleeve portion received annularly about the screw shaft and at least one flute extending radially outward from the sleeve portion, said method comprising:
axially installing a puller collar onto the at least one screw element;
installing at least one engaging element on said puller collar to axially lock said puller collar to the at least one screw element, said at least one engaging element extending radially inward relative to an inner diameter of said puller collar beyond an outer radial edge of the at least one flute;
applying an axial pulling force to said puller collar to axially move the at least one screw element relative to the screw shaft;
removing a tip element from an end of the screw shaft;
threadedly connecting an extension shaft to the end of the screw shaft;
connecting a puller shaft tailpiece to said extension shaft; and,
connecting said puller shaft tailpiece to said puller collar after said puller collar is axially installed onto the at least one screw element and said at least one engaging element is installed on said puller collar.

19. A puller assembly for removing at least one screw element from a screw shaft of a screw-type extrusion machine, the at least one screw element received annularly about the screw shaft with at least one flute extending radially outward, said puller assembly comprising:

a body having a sleeve portion with an inner diameter appropriately sized for receipt of the at least one screw element on the screw shaft;
a plurality of engaging elements extending radially inward relative to said inner diameter of said body beyond an outer radial edge of the at least one flute of the at least one screw element, wherein one of said plurality of engaging elements is removable from said body for enabling said body to be axially installed on the at least one screw element when said one of said plurality of engaging elements is removed from said body and said plurality of engaging elements axially locking said body on the at least one screw element when said one of said plurality of engaging elements is installed in said body; and
a pulling device for selectively applying an axial pulling force to said body to axially move said at least one screw element along said screw shaft, said one of said of plurality of engaging elements engaging said at least one flute to thereby axially force said one of said plurality of engaging elements to move along said shaft,
said pulling device includes:
an extension shaft removably secured to one end of said screw shaft;
a puller shaft tailpiece annularly disposed on said extension shaft and axially spaced apart from said body;
at least one connector element connected to each of said body and said puller shaft tailpiece; and
a drive assembly that, upon actuation, moves said puller shaft tailpiece axially along said extension shaft and through said at least one connector element axially moves said body to move said at least one screw element along said screw shaft.

20. The puller assembly of claim 19 wherein said plurality of engaging elements includes:
at least three axial engaging elements circumferentially disposed around said body wherein each of said axial engaging elements has a radial width substantially greater than an axial width; and
at least one anti-rotation engaging element removably secured to the body for preventing significant relative rotation between said body and the at least one screw element.

* * * * *